(12) United States Patent
Iwamoto (10) Patent No.: US 10,221,812 B2
(45) Date of Patent: Mar. 5, 2019

(54) CANISTER

(71) Applicant: FUTABA INDUSTRIAL CO., LTD., Okazaki-shi, Aichi (JP)

(72) Inventor: Koji Iwamoto, Okazaki (JP)

(73) Assignee: FUTABA INDUSTRIAL CO., LTD., Okazaki-shi, Aichi (JP)

( * ) Notice: Subject to any disclaimer, the term of this patent is extended or adjusted under 35 U.S.C. 154(b) by 0 days.

(21) Appl. No.: 15/837,847

(22) Filed: Dec. 11, 2017

(65) Prior Publication Data

US 2018/0163671 A1 Jun. 14, 2018

(30) Foreign Application Priority Data

Dec. 12, 2016 (JP) .................... 2016-240335

(51) Int. Cl.
  *F02M 1/00* (2006.01)
  *F02M 25/08* (2006.01)
  *B01D 53/04* (2006.01)

(52) U.S. Cl.
  CPC ..... *F02M 25/0854* (2013.01); *B01D 53/0446* (2013.01); *B01D 2253/102* (2013.01); *B01D 2253/308* (2013.01); *B01D 2253/34* (2013.01); *B01D 2257/702* (2013.01)

(58) Field of Classification Search
  CPC ............ F02D 41/0032; F02M 25/0854; F02M 25/0872
  USPC ........... 123/516–520; 96/121, 130, 131, 144, 96/146
  See application file for complete search history.

(56) References Cited

U.S. PATENT DOCUMENTS

| | | | | |
|---|---|---|---|---|
| 7,543,574 B2* | 6/2009 | Yamazaki | .......... | B01D 53/0415 123/519 |
| 7,670,412 B2* | 3/2010 | Kido | .................. | B01D 53/0438 123/519 |
| 7,922,797 B2* | 4/2011 | Kosugi | .............. | B01D 53/0415 123/519 |
| 8,506,691 B2* | 8/2013 | Yamada | ............. | F02M 25/0854 123/519 |
| 8,545,610 B2* | 10/2013 | Makino | .............. | B01D 53/0438 123/519 |

(Continued)

FOREIGN PATENT DOCUMENTS

| | | |
|---|---|---|
| JP | H05202818 A | 8/1993 |
| JP | 2002266709 A | 9/2002 |

(Continued)

OTHER PUBLICATIONS

Notification of Reasons for Refusal for Japanese Patent Application No. 2016-240335, dated Oct. 2, 2018 (7 pages including English machine translation).

*Primary Examiner* — John Kwon (74) *Attorney, Agent, or Firm* — Withrow & Terranova, P.L.L.C.; Vincent K. Gustafson (57) ABSTRACT

A canister is mounted on a vehicle and comprises at least one chamber, an inflow port, an atmosphere port, an outflow port and elongated adjusting parts. The inflow port allows evaporated fuel to flow into the at least one chamber from a fuel tank of the vehicle. The outflow port allows the evaporated fuel adsorbed by an adsorbent to flow out towards an engine by air from the atmosphere port. The adjusting parts are arranged with the adsorbent in an object chamber, which is at least one of the at least one chamber.

9 Claims, 3 Drawing Sheets

(56) References Cited

U.S. PATENT DOCUMENTS

| | | | | |
|---|---|---|---|---|
| 8,617,299 | B2* | 12/2013 | Hasegawa | B01D 53/02 123/519 |
| 8,733,325 | B2* | 5/2014 | Takamatsu | F02M 25/0854 123/516 |
| 8,900,350 | B2* | 12/2014 | Suzuki | B01D 53/22 123/518 |
| 2002/0007826 | A1* | 1/2002 | Yamada | F02M 25/0854 123/519 |
| 2002/0124732 | A1 | 9/2002 | Hara et al. | |
| 2006/0102156 | A1* | 5/2006 | Yamauchi | B01D 53/0415 123/519 |
| 2014/0124385 | A1 | 5/2014 | Yamasaki et al. | |

FOREIGN PATENT DOCUMENTS

| | | |
|---|---|---|
| JP | 2009191688 A | 8/2009 |
| JP | 2010007671 A | 1/2010 |
| JP | 2012002122 A | 1/2012 |
| JP | 2013011243 A | 1/2013 |

* cited by examiner

CANISTER

CROSS-REFERENCE TO RELATED APPLICATIONS

This application claims the benefit of Japanese Patent Application No. 2016-240335 filed Dec. 12, 2016 in the Japan Patent Office, the disclosure of which is incorporated by reference herein.

BACKGROUND

The present disclosure relates to a canister that adsorbs evaporated fuel generated in a fuel tank.

Canisters have been known, which have chambers provided with adsorbents made of activated carbons and so on. A canister disclosed in Japanese Unexamined Patent Application Publication No. 2009-191688 have chambers each of which is divided into elongated filling passages by partition members. These filling passages extend in a direction in which evaporated fuel and air introduced by purge (hereinafter, referred to as purge air) flow down. The filling passages are filled with pellets being adsorbents for the evaporated fuel. Each pellet has an elongated shape such as a cylindrical shape. There is hence a gap created between each pellet arranged in each filling passage. As a result, ventilation resistance generated when the evaporated fuel and the purge air flow through each chamber is reduced.

SUMMARY

However, regarding each canister chamber, the evaporated fuel and the purge air are unlikely to flow into the filling passages adjacent to the side walls of the chamber. Accordingly, in those plural filling passages, fuel adsorption by and desorption from the plural pellets have not been sufficiently performed. That is, in each canister chamber, there have been uneven flows of the evaporated fuel and the purge air. Therefore, fuel adsorption and desorption have not been performed efficiently.

It is preferable to perform fuel adsorption and desorption efficiently and to reduce ventilation resistance in the canister.

A canister of an aspect of the present disclosure is mounted on a vehicle having an engine and comprises at least one chamber. The canister comprises an adsorbent, an inflow port, an atmosphere port, an outflow port, and elongated adjusting parts. The adsorbent is powdery or granular particles that adsorbs evaporated fuel and is arranged in the at least one chamber. The inflow port allows the evaporated fuel to flow into the at least one chamber from a fuel tank of the vehicle. The atmosphere port allows air to flow into the at least one chamber from an outside of the vehicle. The outflow port allows the evaporated fuel adsorbed by the adsorbent to flow out towards the engine by the air from the atmosphere port. The adjusting parts are arranged with the adsorbent in an object chamber, which is at least one of the at least one chamber. In a case the at least one chamber includes one chamber, the one chamber is the object chamber. In a case the at least one chamber includes chambers, at least one of the chambers is the object chamber. The adjusting parts have spaces around the respective adjusting parts communicating with one another and are distributed in the object chamber.

The adsorbent is the powdery or granular particles. Therefore, gaps are easily created between the particles near each of the adjusting parts, and the density of the adsorbent becomes lower near each of the adjusting parts compared with other regions. Accordingly, the evaporated fuel that flowed in from the inflow port and the purge air that flowed in from the atmosphere port can flow easily near the adjusting parts. As a result, ventilation resistance is reduced in the whole of the object chamber.

The spaces around the respective adjusting parts communicate with each other. It is thus possible to inhibit uneven flows of the evaporated fuel and the purge air in the whole object chamber. Therefore, fuel adsorbed by the adsorbent is encouraged to spread through the object chamber. Further, at a time of purging, the fuel is encouraged to be desorbed from the adsorbent in the whole object chamber.

Accordingly, it is possible to perform fuel adsorption and desorption preferably and to reduce ventilation resistance in the canister.

The adsorbent arranged in the object chamber may be the granular particles having a specific shape. An interval between the adjusting parts adjacent each other may be determined based upon a size of each of the particles being the adsorbent According to such configuration, an appropriate interval is provided between the adjusting parts. Therefore, it is possible to reduce occurrences of excessively large gaps among the adsorbent filling the spaces between the adjusting parts. The spaces are hence filled with the adsorbent appropriately.

The adsorbent arranged in the object chamber may be the granular particles having a selected shape. A minimum value of a distance between a side portion of each of the adjusting parts and a wall portion of the object chamber may be determined based upon a size of each of the particles being the adsorbent According to such configuration, an appropriate interval is provided between the side portion of each of the adjusting parts and the wall portion of the object chamber. In this case, it is possible to reduce occurrences of excessively large gaps among the adsorbent filling the space between the side portion of each of the adjusting parts and the wall portion of the object chamber. The spaces are hence filled with the adsorbent appropriately.

Each of the particles being the adsorbent may be in a cylindrical shape. The same effects are obtained for the case having such configuration.

Each of the adjusting parts may extend linearly in the same or approximately the same direction.

As a process of manufacturing the canister of the present disclosure, there is a possibility to employ a method of first arranging the adjusting parts in the object chamber and then providing the adsorbent in the object chamber. According to the above-mentioned configuration, when such method is employed, the periphery of each of the adjusting parts is easily filled with the adsorbent. Therefore, the canister is easily manufactured.

Each of the adjusting parts may be in a cylindrical shape or a substantially cylindrical shape. Each of the adjusting parts may be in a prismatic shape. The same effects are obtained for the case having such configuration.

A cross section perpendicular to a flow-down direction in which the air or the evaporated fuel flows down in an internal space of the object chamber is regarded as a crossing cross section. A sum of areas of cross sections of the adjusting parts on the crossing cross section is regarded as a total cross sectional area. The number of the adjusting parts and the thickness of each of the adjusting parts may be configured in a manner that the total cross sectional area is equal to or greater than 1% and equal to or smaller than 30% of an area of the crossing cross section.

According to such configuration, it is possible, in the object chamber, to preferably perform fuel adsorption and desorption and to reduce ventilation resistance.

The canister may have the chambers. The inflow port is coupled to any chamber of the chambers. The outflow port may be coupled to the chamber to which the inflow port is coupled thereto. The atmosphere port may be coupled to any of the chambers, which is different from the chamber to which the inflow port and the outflow port are coupled thereto. The chamber to which the atmosphere port is coupled thereto may be the object chamber.

The same effects are obtained for the case having such configuration.

The object chamber to which the atmosphere port is coupled thereto may be in an elongated shape that extends along a flow-down direction in which the air and the evaporated fuel flow down or along a direction approximately the same as the flow-down direction. The adjusting parts may extend along the flow-down direction in which the air and the evaporated fuel flow down or in the direction approximately the same as the flow-down direction.

The same effects are obtained for the case having such configuration.

BRIEF DESCRIPTION OF THE DRAWINGS

Example embodiments of the present disclosure will be described hereinafter by way of example with reference to the accompanying drawings, in which.

DETAILED DESCRIPTION OF THE PREFERRED EMBODIMENTS

Modes for carrying out the present disclosure are not limited to embodiments described below, and any various modes may be employed within the technical scope of the present disclosure.

[Embodiment 1]

[Configuration of Canister]

Figure 1:
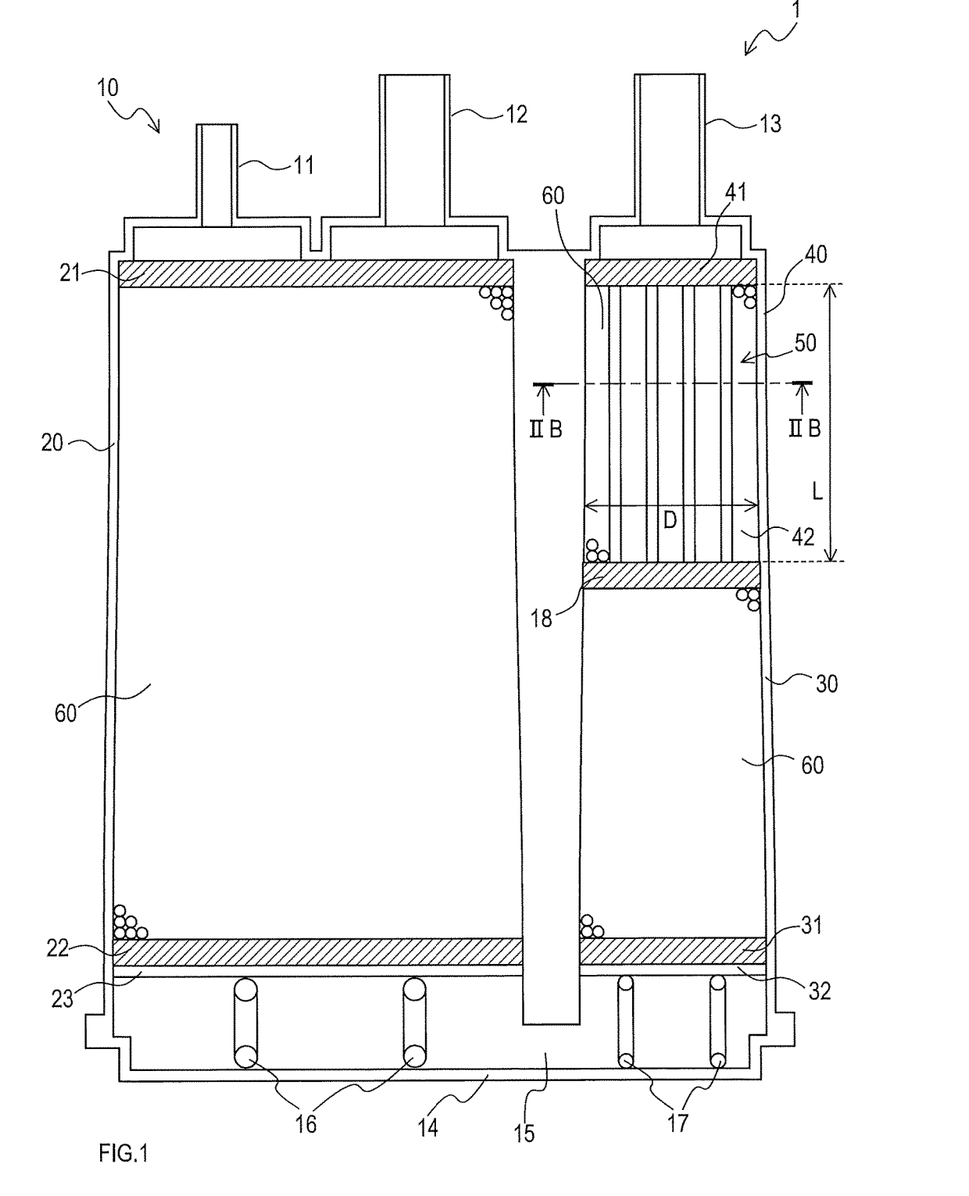
FIG. 1 is a cross sectional view of a canister viewed from the side according to a first embodiment.

A canister 1 according to a first embodiment illustrated in FIG. 1 is mounted on a vehicle. Hereinafter, a vehicle, on which the canister 1 is mounted, is referred to as an own vehicle. The canister 1 has a casing 10 made of synthetic resin. The casing 10 has a first chamber 20, a second chamber 30, and a third chamber 40, each having an internal space. Adsorbents to adsorb evaporated fuel are arranged in the internal spaces of the first, second, and third chambers 20, 30, and 40. The adsorbent is powdery or granular particles. The adsorbent may be activated carbon or a substance generated from activated carbon, by way of example. The adsorbent may also be a substance other than activated carbon.

Provided at one end of the casing 10 are an inflow port 11, an outflow port 12, and an atmosphere port 13. The inflow port 11 and the outflow port 12 couple the internal space of the first chamber 20 to the outside of the casing 10. The atmosphere port 13 couples the internal space of the third chamber 40 to the outside of the casing 10.

The inflow port 11 is coupled to a fuel tank of the own vehicle. A fuel is stored in the fuel tank so that the fuel is supplied to an engine of the own vehicle. Evaporated fuel generated from the fuel flows into the interior of the canister 1 via the inflow port 11 and is adsorbed by the adsorbents arranged in the respective chambers. Therefore, fuel is accumulated inside the canister 1.

The outflow port 12 is coupled to an intake pipe (not shown) of the engine of the own vehicle. The atmosphere port 13 communicates with the outside of the own vehicle. Air (hereinafter, referred to as purge air) is introduced into the canister 1 via the atmosphere port 13 by intake negative pressure of the engine. The purge air flowing into the canister 1 enables desorption of the fuel adsorbed by the adsorbents. The desorbed fuel flows out with the purge air from the outflow port 12 to the intake pipe. Accordingly, the fuel adsorbed by the activated carbons is removed and the activated carbons are regenerated. This regeneration of the activated carbons is called purge.

Next, the configuration of the canister 1 will be described in detail. Hereinafter, the side of the casing 10 of the canister 1, at which the inflow port 11, the outflow port 12, and the atmosphere port 13 are provided, is referred to as a port side. The casing 10 has an opening at the side opposite to the port side, and the opening is closed by a lid member 14. Hereinafter, the side opposite to the port side (i.e., the side provided with the lid member 14) is referred to as a lid side.

The first chamber 20 and its internal space are each formed in an approximately rectangular parallelepiped shape or cylindrical shape, for example. An end at the port side of the internal space communicates with the inflow port 11 and the outflow port 12. A filter 21 is arranged at the end at the port side of the internal space, and a filter 22 is arranged at an end at the lid side of the internal space. An adsorbent 60 is arranged between the filters 21 and 22.

The end at the lid side of the internal space of the first chamber 20 communicates with a communicating passage 15. The communicating passage 15 extends along the lid member 14 and couples the internal space of the first chamber 20 to an internal space of the second chamber 30. A porous plate 23 having permeability is arranged between the filter 22 at the lid side of the first chamber 20 and the communicating passage 15. Coil springs 16 are provided between the porous plate 23 and the lid member 14. The coil springs 16 press the porous plate 23 towards the port side. Therefore, in the canister 1, fluid can come and go between the internal space of the first chamber 20 and the internal space of the second chamber 30 via the communicating passage 15.

The second chamber 30 and the third chamber 40 are arranged adjacent to the first chamber 20, and each has an elongated shape extending from the lid side to the port side. The second and third chambers 30 and 40 are aligned from the lid side to the port side, having ends adjacent to each other. The internal space of the second chamber 30 is separated from the internal space of the third chamber 40 by a plate shaped partition member 18 having permeability. The partition member 18 may comprise a porous plate and/or a filter and so on, for example. As a result, in the canister 1, fluid can come and go between the internal space of the second chamber 30 and the internal space of the third chamber 40 through the partition member 18.

A filter 31 is arranged at the end at the lid side of the second chamber 30, and a filter 41 is arranged at the end at the port side of the third chamber 40. The adsorbent 60 is arranged between the filter 31 in the internal space of the second chamber 30 and the partition member 18 and is also arranged between the filter 41 in the internal space of the third chamber 40 and the partition member 18.

A porous plate 32 having permeability is arranged between the filter 31 at the lid side of the second chamber 30 and the communicating passage 15. Coil springs 17 are provided between the porous plate 32 and the lid member 14. The coil springs 17 press the porous plate 32 towards the port side.

The end at the port side of the internal space of the third chamber 40 communicates with the atmosphere port 13. The third chamber 40 and its internal space extend along a direction, in which the evaporated fuel and the purge air flow down (hereinafter, referred to as flow-down direction), or along a direction approximately the same as the flow-down direction and each form an elongated space having a fixed width. According to the first embodiment, the third chamber 40 and its internal space exhibit a cylindrical shape as an example. However, the third chamber 40 and its internal space may have other shapes. For example, the third chamber 40 and its internal space may be each formed in a polygonal prismatic shape.

[Adjusting Member]

As for the canister of the present disclosure, at least one of the at least one chamber of the canister is an object chamber. In a case the at least one chamber includes one chamber, the one chamber is the object chamber. In a case the at least one chamber includes chambers, at least one of the chambers is the object chamber. An adjusting member 50 is arranged in the object chamber with an adsorbent. According to the first embodiment, the third chamber 40 is the object chamber by way of example. It is obvious that the first or second chamber 20 or 30 may be the object chamber instead of the third chamber 40. Further, more than two chambers out of the first, second, and third chambers 20, 30, and 40 may be the object chamber. The adjusting member 50 arranged in the third chamber 40 will be described herein.

Figures 2A, 2B, 2D, 2E, 2F, 2G:
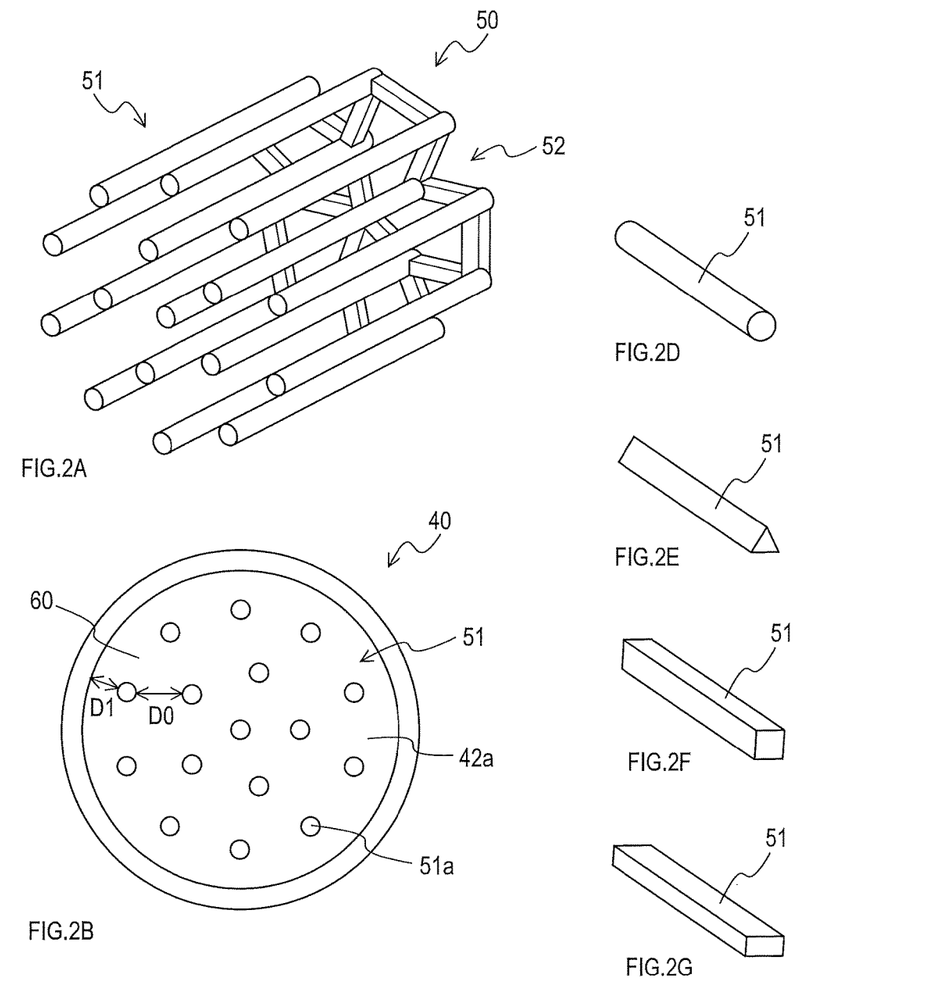
FIG. 2A is a perspective view of an adjusting member of the first embodiment.
FIG. 2B is a cross sectional view taken along lines IIB-IIB in FIG. 1 and schematically illustrating an internal space of a third chamber of the canister of the first embodiment.
FIG. 2D is a perspective view of a bar member of the adjusting member.
FIG. 2E is a perspective view of a bar member of the adjusting member.
FIG. 2F is a perspective view of a bar member of the adjusting member.
FIG. 2G is a perspective view of a bar member of the adjusting member.

As illustrated in FIGS. 1, 2A, and 2B, arranged inside the internal space of the third chamber 40 (hereinafter, referred to as a third space 42) is the adjusting member 50 together with the adsorbent 60. The adjusting member 50 includes elongated bar members 51 and coupling member 52. The coupling member may be formed integrally as one piece or from separated pieces that are coupled to each other.

The bar members 51 extend in a linear form or approximately linearly. The bar members 51 extend in the same direction or approximately the same direction. More specifically, the bar members 51 extend in a direction extending from the port side of the third space 42 to the lid side thereof or in a direction approximately the same as the aforementioned direction. In other words, the bar members 51 extend along the flow-down direction in which the purge air and the evaporated air flow down, or along the direction approximately the same as the flow-down direction.

Figure 2C:
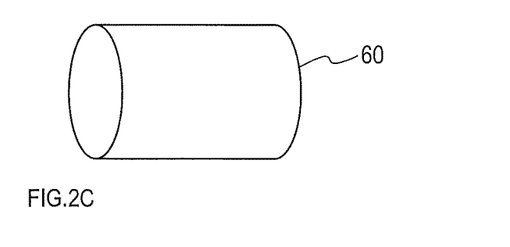
FIG. 2C is a perspective view of a pellet.
Figure 2H:
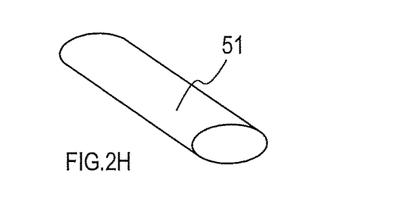
FIG. 2H is a perspective view of a bar member of the adjusting member.

As illustrated in FIG. 2D, each of the bar members 51 is formed in a cylindrical shape having a circular bottom surface, as an example. However, each bar member 51 may be formed in other shapes. Specifically, each bar member 51 may be formed in a polygonal prismatic shape. More specifically, each bar member 51 may be formed in a triangular prismatic shape, as illustrated in FIG. 2E. Further, each bar member 51 may be formed in a quadrangular prismatic shape with a square or rectangular bottom surface, as illustrated in FIGS. 2F and 2G. Still further, each bar member 51 may be formed in a cylindrical shape with an oval bottom surface as illustrated in FIG. 2H, for example. Each bar member 51 also may be formed in a belt-like shape, for example.

The coupling member 52 is provided at one end of each of the respective bar members 51 and couples to the bar members 51 as an integrated member. Specifically, the coupling member 52 couples the side surfaces of the bar members 51 to each other at the one ends thereof. Accordingly, the positions and orientations of the bar members 51 are fixed. The coupling member 52 is positioned at the port side of the third space 42. The coupling member 52 may be positioned at the lid side of the third space 42. The coupling member 52 may be integrated to a portion corresponding to the third chamber 40 of the casing 10.

Spaces around each of the bar members 51, i.e., side spaces of the bar members 51, communicate with each other. That is, the bar members 51 are each arranged having a specific distance relative to the other bar members 51. Accordingly, there is no region existing in the third space 42 that is tightly surrounded by the bar members 51 and thus isolated from other regions in the third space 42.

The bar members 51 are distributed in the whole third space 42. That is, as illustrated in FIG. 2B, the bar members 51 are arranged in a manner that the bar members 51 are distributed in an equal or approximately equal manner along a cross section perpendicular to the longitudinal direction of the third chamber 40. The bar members 51 are also arranged having a specific distance away from a wall portion (hereinafter, referred to as side wall) in contact with the side surface of the third space 42. The bar members 51 are also arranged passing through the center and the central periphery in the width direction of the third space 42.

The bar members 51 extend from the end surface at the port side of the third space 42 to the end surface at the lid side of the third space 42. The end surface is a wall in contact with the end of the third space 42. That is, the one ends of the bar members 51 (in other words, the coupling member 52) are in contact with the end surface at the port side of the third space 42 (in other words, the filter 41) or are positioned adjacent to the end surface. On the other hand, the other ends of the bar members 51 are in contact with the end surface at the lid side of the third space 42 (in other words, the partition member 18) or are positioned adjacent to the end surface at the lid side of the third space 42.

The adsorbent 60 provided in the third chamber 40 may be granular particles each having a selected shape. Specifically, for example, the adsorbent 60 may be pellets. Herein, the pellet refers to granular activated carbon. The pellet is made by kneading powdery activated carbons with binders and by being molded into a selected shape. As illustrated in FIG. 2C, according to the first embodiment, a pellet 60 exhibits a cylindrical shape as an example. The pellet 60 may have a bottom surface of which diameter is approximately 2 mm, for example. Further, the distance between the two bottom surfaces of the pellet 60 (in other words, the length of the pellet 60) may be approximately 3 to 5 mm, for example. The pellet may have other shapes. Further, an adsorbent other than the pellets may be provided in the third chamber 40, for example powdery activated carbons and so on.

The distance between the adjacent bar members 51 (D0 in FIG. 2B as an example) is determined based upon the size of the pellet 60. Specifically, for example, the distance may be longer than either the bottom surface diameter of the pellet 60 or the length thereof.

The minimum value of the distance between the side portion of each bar member 51 and the side wall of the third space 42 (D1 in FIG. 2B as an example) is also determined based upon the size of the pellet 60. Specifically, for example, the minimum value may be longer than either the bottom surface diameter of the pellet 60 or the length thereof. In other words, the distance between the side surface of each of one or more bar members, which are positioned outermost among the bar members 51, and the side wall of the third space 42 may be longer than either the bottom surface diameter of the pellet 60 or the length thereof.

Here, as for the third space 42, a cross section perpendicular to the flow-down direction in which the fuel or the purge air and so on flows down (in other words, the direction in which the end surface at the lid side of the third space 42 faces the end surface at the port side thereof) is referred to as a crossing cross section. FIG. 2B illustrates a crossing cross section 42a of the third space 42. As illustrated in FIG. 2B, there are cross sections of the bar members 51 on the crossing cross section 42a. The sum of the areas of the cross sections of the bar members 51 is referred to as a total cross sectional area. FIG. 2B also illustrates cross sections 51a of the bar members 51 on the crossing cross section 42a. The quantity of the bar members 51 and the thickness of each bar member 51 may be configured in a manner that the total cross sectional area is equal to or greater than 1% and equal to or smaller than 30% of the total area of the crossing cross section 42a. Accordingly, it is possible to preferably perform fuel adsorption and desorption in the third chamber 40 and to reduce ventilation resistance.

As an example, regarding the crossing cross section 42a illustrated in FIG. 2B, the total cross sectional area accounts for about 7.5% of the entire area of the crossing cross section 42a.

According to the first embodiment, the third space 42 is an elongated space having a fixed width. Each bar member 51 has a cylindrical shape having a fixed width. That is, no matter where the crossing cross section 42a is provided in the third space 42, the size of the crossing cross section 42a and the cross sectional size of each bar member 51 are each made constant.

However, the width of the third space 42 and/or the width of each bar member 51 each do not have to be constant. That is, depending on where the crossing cross section 42a is arranged in the third space 42, the size of the crossing cross section 42a and/or the cross sectional size of each bar member 51 may be varied. Even in such cases, wherever the crossing cross section 42a is provided, the number of the bar members 51 and the thickness of each bar member 51 may be configured in a manner that the total cross sectional area accounts for equal to or greater than 1% and equal to or smaller than 30% of the entire area of the crossing cross section 42a.

[Effects]

(1) Regarding the canister 1 of the first embodiment, the adjusting member 50 is arranged in the third chamber 40 together with the adsorbent 60. The adsorbent 60 in the third chamber 40 is made of cylindrically-shaped pellets. Therefore, a gap is likely to be created between each pellet near each bar member 51 of the adjusting member 50. That is, the density of the pellets is likely to be lowered near each bar member 51 compared with other regions in the third chamber 40. Accordingly, this facilitates the flows of the evaporated fuel that flowed in from the inflow port 11 and the purge air that flowed in from the atmosphere port 13 near each bar member 51. As a result, ventilation resistance is reduced in the whole third chamber 40, and fuel is hence supplied to the fuel tank in a good manner.

Here, as illustrated in FIG. 1, the longitudinal length of the third chamber 40 is denoted with "L," and the width length thereof is denoted with "D." In the canister 1 of the first embodiment, even if the third chamber 40 is configured such that L/D becomes great, it is possible to reduce ventilation resistance. Therefore, while reducing ventilation resistance, it is possible to adsorb the evaporated fuel introduced from the inflow port 11 more reliably and to desorb the fuel adsorbed by the adsorbent 60 more easily at a time of purging.

Spaces surrounding each of the bar members 51 communicate with one another. Therefore, it is possible to inhibit uneven flows of the evaporated fuel and the purge air in the third chamber 40. The fuel adsorbed by the adsorbent 60 is hence encouraged to be distributed through the whole third chamber 40. Further, at a time of purging, the fuel is encouraged to be desorbed from the adsorbent 60 through the whole third chamber 40.

Accordingly, it is possible to perform favorably the fuel adsorption and desorption and to reduce the ventilation resistance in the canister 1.

(2) According to the first embodiment, the intervals between the adjacent bar members 51 are determined based upon the size of the pellets being the adsorbent 60. An appropriate distance is thus provided between the bar members 51. As a result, the multiple pellets can spread through the whole spaces among the bar members 51. Therefore, it is possible to reduce occurrences of excessively large gaps among the multiple pellets filling the spaces. The spaces are therefore preferably filled with the multiple pellets.

(3) According to the first embodiment, the minimum value of the distance between the side portion of each bar member 51 and the side wall of the third space 42 is determined based upon the size of the pellet being the adsorbent 60. An appropriate interval can be thus provided between each bar member 51 and the side wall of the third space 42. As a result, the multiple pellets can spread through the whole spaces between the bar members 51 and the side wall of the third space 42. Therefore, it is possible to reduce occurrences of excessively large gaps among the multiple pellets filling the spaces. The spaces are therefore appropriately filled with the multiple pellets.

(4) According to the first embodiment, the bar members 51 extends in a linear form or approximately linearly in the direction from the port side towards the lid side or in a direction approximately the same as the aforementioned direction. As a process of manufacturing the canister 1, there is a possibility to employ a method of first arranging the adjusting member 50 in the third space 42 and then providing the adsorbent 60 in the third space 42. According to the above-mentioned configuration, when this type of method is employed, the periphery of each bar member 51 of the adjusting member 50 is easily filled with the adsorbent 60. Therefore, the canister 1 is easily manufactured.

(5) According to the first embodiment, the number of the bar members 51 and the thickness of each bar member 51 are configured in a manner that the total cross sectional area accounts for equal to or greater than 1% and equal to or smaller than 30% of the entire area of the crossing cross section 42a of the third space 42. Therefore, it is possible to reduce ventilation resistance in the third chamber 40 while appropriately performing fuel adsorption and desorption in the third chamber 40.

[Embodiment 2]

Figure 3:
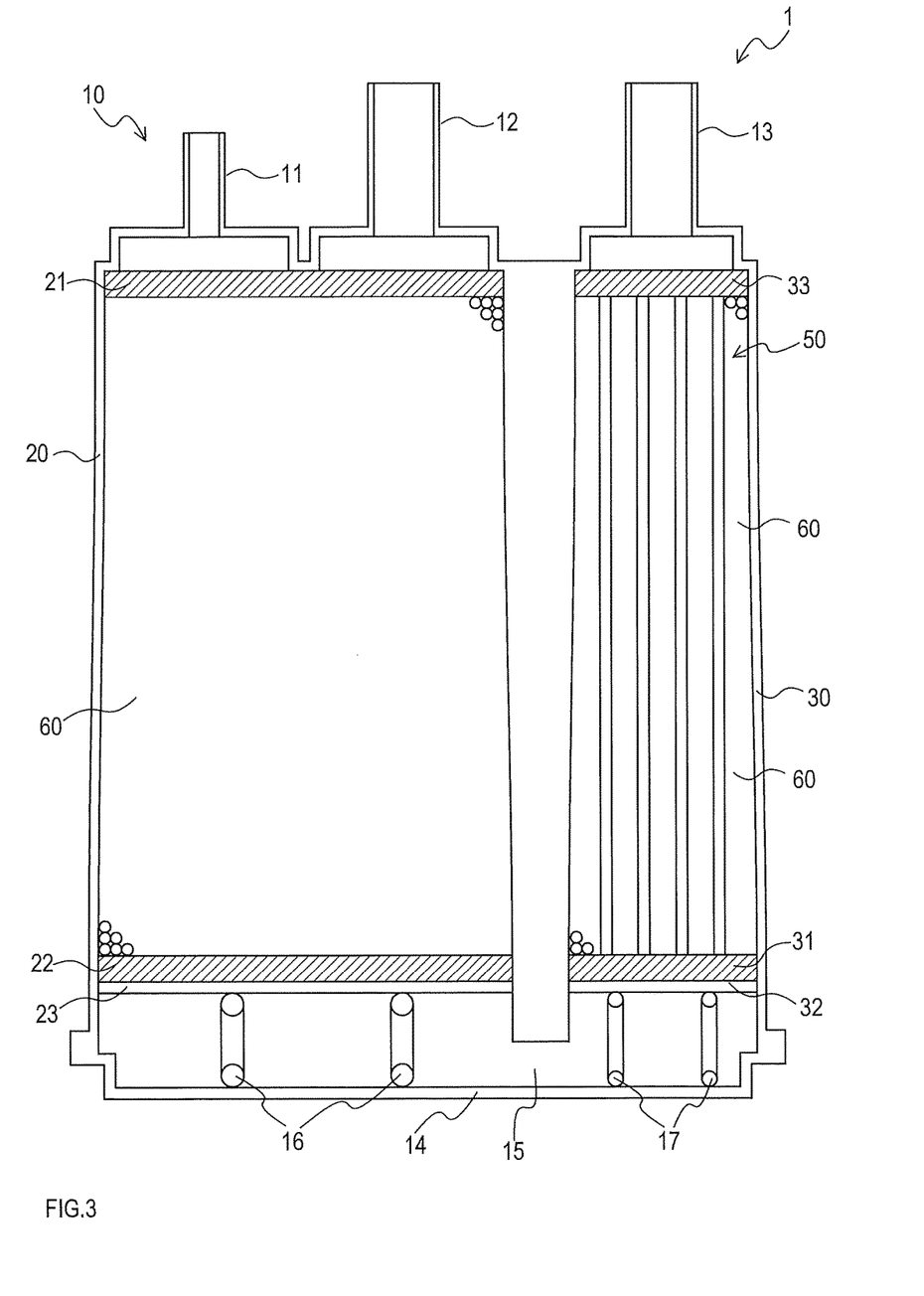
FIG. 3 is a cross sectional view of a canister viewed from the side according to a second embodiment.

Next, described below is a canister 1 of a second embodiment with reference to FIG. 3. As illustrated in FIG. 3, the canister 1 of the second embodiment has the same configuration as the canister 1 of the first embodiment. However, the canister 1 of the second embodiment is different from the one of the first embodiment in that the canister 1 of the second embodiment has a first chamber 20 and a second chamber 30. The canister 1 of the second embodiment will be described hereinafter focusing on the differences from the first embodiment.

According to the second embodiment, the atmosphere port 13 is provided at the second chamber 30. The second chamber 30 and its internal space each has an elongated shape extending from the communicating passage 15 to the atmosphere port 13. In other words, the second chamber 30 and its internal space extend in a flow-down direction in which evaporated fuel and purge air flow down or in a direction approximately the same as the flow-down direction. The end at the port side of the internal space of the second chamber 30 is coupled to the atmosphere port 13. The filter 31 is arranged at the end at the lid side of the second chamber 30, and a filter 33 is arranged at the end at the port side of the second chamber 30. The adsorbent 60 is arranged between the filters 31 and 33 in the internal space of the second chamber 30.

The second chamber 30 and its internal space respectively have the same shapes as the third chamber 40 and the third space 42 of the canister 1 of the first embodiment. That is, the second chamber 30 and its internal space are elongated spaces having fixed widths.

According to the second embodiment, as an example, the second chamber 30 is the object chamber in which the adjusting member 50 is arranged with the adsorbent 60. The first chamber 20 may be the object chamber instead of the second chamber 30. Further, both of the first and second chambers 20 and 30 may be the object chambers. The adjusting member 50 arranged in the second chamber 30 has the same configuration as the first embodiment. The adjusting member 50 is arranged in the second chamber 30 in the same manner as the first embodiment.

According to the second embodiment similarly to the first embodiment, the number of the bar members 51 and the thickness of each bar member 51 may be configured in a manner that the total cross sectional area is equal to or greater than 1% and equal to or smaller than 30% of the entire area of the crossing cross section of the internal space of the second chamber 30.

[Effects]

According to the canister 1 of the second embodiment, similarly to the first embodiment, it is possible to reduce ventilation resistance while appropriately performing fuel adsorption and desorption.

[Other Embodiments]

(1) The canister 1 of the first embodiment comprises the three chambers. The canister 1 of the second embodiment comprises the two chambers. However, even for a canister comprising a single chamber or four or more chambers, at least one of the chambers may be configured as the object chamber in which the adjusting member 50 is arranged.

(2) In the canisters 1 of the first and second embodiments, the bar members 51 is arranged in the object chamber while extending along the flow-down direction in which evaporated fuel and purge air flow down. The bar members 51 extends in a linear form or approximately linearly. However, the bar members 51 may extend in the flow-down direction while having one or more curves or bends. Further, the bar members 51 may extend spirally in the flow-down direction, for example. The bar members 51 each may be shaped differently.

The bar members 51 may extend along a direction being different from the flow-down direction of the evaporated fuel and the purge air. The directions in which the bar members 51 extend may vary. Further, the bar members 51 may individually extend along any one of the two or more directions.

Even in such cases, when the adsorbent arranged in the object chamber comprises granular particles having a selected shape, the interval between the adjacent bar members 51 may be determined based upon the size of the particles in the same manner as the first and second embodiments. The minimum value of the distance between the side of each bar member and the side wall of the internal space of the object chamber may be determined based upon the size of the particles in the same manner as the first and second embodiments. Similarly to the first and second embodiments, the quantity of the bar members and the thickness of each bar member may be configured in a manner that the total cross sectional area is equal to or greater than 1% and equal to and smaller than 30% of the total area of the crossing cross section in the object chamber.

(3) The adjusting member 50 of the first and second embodiments exhibits a configuration in which the bar members 51 are integrated by the coupling member 52. However, for example, bar members 51 may be arranged in the object chamber in the same manner as the first and second embodiments while not being integrated. Further, for example, the bar members 51 may be attached to the wall of the object chamber at their ends and arranged in the same manner as the first and second embodiments.

(4) Functions of the single element of the above embodiments may be achieved by the plurality of elements, and the single function of the single element may be achieved by the plurality of elements. The plurality of functions of the plurality of elements may be achieved by the single element, and the single function achieved by the plurality of elements may be achieved by the single element. A part of the configurations of the above embodiments may be omitted. At least a part of the configurations of the above embodiments may be added to or replaced by the configuration of the other embodiment. Any modes encompassed in the technical idea specified by the terms described in the scope of claims are the embodiments of the present disclosure.

[Correspondence to Scope of Claims]

Described below is a correspondence of the terms used to describe the first and second embodiments to the terms used in the scope of claims.

The bar members 51 of the adjusting member 50 correspond to an example of adjusting parts.

What is claimed is:

1. A canister for mounting on a vehicle having an engine, the canister including at least one chamber, the canister comprising:
    an adsorbent that is powdery or granular particles that adsorbs evaporated fuel and is arranged in the at least one chamber;

an inflow port that allows the evaporated fuel to flow into the at least one chamber from a fuel tank of the vehicle;

an atmosphere port that allows air to flow into the at least one chamber from an outside of the vehicle;

an outflow port that allows the evaporated fuel adsorbed by the adsorbent to flow out towards the engine by the air from the atmosphere port; and elongated bars arranged with the adsorbent in an object chamber, which is at least one of the at least one chamber, wherein the bars extend linearly in the same direction or approximately the same direction and are distributed in the object chamber, and wherein the bars are spaced apart from each other and the adsorbent is arranged in a space between the bars.

2. The canister according to claim 1, wherein the adsorbent arranged in the object chamber is the granular particles having a specific shape, and an interval between the bars adjacent each other is determined based upon a size of each of the particles being the adsorbent.

3. The canister according to claim 1, wherein the adsorbent arranged in the object chamber is the granular particles having a selected shape, and a minimum value of a distance between a side portion of each of the bars and a wall portion of the object chamber is determined based upon a size of each of the particles being the adsorbent.

4. The canister according to claim 1, wherein each of the particles being the adsorbent is in a cylindrical shape.

5. The canister according to claim 1, wherein each of the bars is in a cylindrical shape or substantially cylindrical shape.

6. The canister according to claim 1, wherein each of the bars has a prismatic shape.

7. The canister according to claim 1, wherein a cross section perpendicular to a flow-down direction in which the air or the evaporated fuel flows down in an internal space of the object chamber is regarded as a crossing cross section, a sum of areas of cross sections of the bars on the crossing cross section is regarded as a total cross sectional area, and the number of the bars and the thickness of each of the bars are configured in a manner that the total cross sectional area is equal to or greater than 1% and equal to or smaller than 30% of an area of the crossing cross section.

8. The canister according to claim 1, wherein the canister has the chambers, the inflow port is coupled to any chamber of the chambers, the outflow port is coupled to the chamber to which the inflow port is coupled thereto, the atmosphere port is coupled to any of the chambers, which is different from the chamber to which the inflow port and the outflow port are coupled thereto, and the chamber to which the atmosphere port is coupled thereto is the object chamber.

9. The canister according to claim 8, wherein the object chamber to which the atmosphere port is coupled thereto is in an elongated shape that extends along a flow-down direction in which the air and the evaporated fuel flow down or along a direction approximately the same as the flow-down direction, and the bars extends along the flow-down direction in which the air and the evaporated fuel flow down or in the direction approximately the same as the flow-down direction.

* * * * *